(12) United States Patent
Lissotschenko (10) Patent No.: US 10,994,365 B2
(45) Date of Patent: May 4, 2021

(54) APPARATUS FOR GENERATING ELECTRON RADIATION AND THREE-DIMENSIONAL PRINTING APPARATUS

(71) Applicant: Vitalij Lissotschenko, Fröndenberg (DE)

(72) Inventor: Vitalij Lissotschenko, Fröndenberg (DE)

( * ) Notice: Subject to any disclaimer, the term of this patent is extended or adjusted under 35 U.S.C. 154(b) by 0 days.

(21) Appl. No.: 16/576,460

(22) Filed: Sep. 19, 2019

(65) Prior Publication Data
US 2021/0008656 A1    Jan. 14, 2021

(30) Foreign Application Priority Data

Jul. 10, 2019    (DE) .......................... 102019118657.9

(51) Int. Cl.
*B23K 15/00* (2006.01)
*H01J 1/13* (2006.01)
(Continued)

(52) U.S. Cl.
CPC ...... *B23K 15/0086* (2013.01); *B23K 15/0006* (2013.01); *B23K 15/0026* (2013.01);
(Continued)

(58) Field of Classification Search
CPC ......... B33Y 10/00; B33Y 30/00; B33Y 50/00; B33Y 50/02; B33Y 80/00;
(Continued)

(56) References Cited

U.S. PATENT DOCUMENTS

| 2015/0144800 A1* | 5/2015 | Lissotschenko | H01J 29/48 250/396 R |
| 2017/0007367 A1* | 1/2017 | Li | A61C 7/08 |
| 2017/0266728 A1* | 9/2017 | Johnson | B33Y 50/02 |

FOREIGN PATENT DOCUMENTS

| DE | 102012103593 A1 | 10/2013 |
| DE | 102015108444 A1 | 12/2016 |

OTHER PUBLICATIONS

Office Action in corresponding German Patent Application No. 102019118657.9, dated Jun. 22, 2020, with English translation.

* cited by examiner

*Primary Examiner* — David A Vanore
(74) *Attorney, Agent, or Firm* — Edell, Shapiro & Finnan, LLC (57) ABSTRACT

An apparatus for generating electron radiation comprises: an elongated, wire-shaped hot cathode to emit electron radiation having an elongated, line-shaped cross section perpendicular to a direction of propagation of the electron radiation; a cathode electrode; an anode electrode with an opening through which the electron radiation emitted from the hot cathode can pass, wherein a voltage applied between the cathode electrode and the anode electrode accelerates electrons emitted from the hot cathode; and a deflecting unit to deflect the electron radiation downstream of the opening of the anode electrode, wherein a cross section of the electron radiation perpendicular to the direction of propagation is changed by the deflecting unit to decease a longitudinal extent of the electron radiation and to increase a transverse extent of the electron radiation such that longitudinal and transverse extents of the electron radiation perpendicular to the direction of propagation are about the same size.

16 Claims, 6 Drawing Sheets

(51) Int. Cl.
*H01J 29/02* (2006.01)
*H01J 1/12* (2006.01)
*H01J 1/36* (2006.01)
B33Y 30/00 (2015.01)
H01J 29/46 (2006.01)

(52) U.S. Cl.
CPC ................ *H01J 1/12* (2013.01); *H01J 1/13* (2013.01); *H01J 1/36* (2013.01); *H01J 29/02* (2013.01); *B33Y 30/00* (2014.12); *H01J 29/46* (2013.01)

(58) Field of Classification Search
CPC ......... H01J 2237/0213; H01J 2237/061; H01J 2237/06308; H01J 29/04; H01J 29/48; H01J 29/70; H01J 31/00; H01J 37/06; H01J 37/147; H01J 37/15; H01J 37/305; H01J 3/30
USPC ..................................................... 250/396 R
See application file for complete search history.

APPARATUS FOR GENERATING ELECTRON RADIATION AND THREE-DIMENSIONAL PRINTING APPARATUS

CROSS REFERENCE TO RELATED APPLICATIONS

This application claims foreign priority under 35 U.S.C. § 119(a)-(d) to Application No. DE 102019118657.9 filed on Jul. 10, 2019, the entire contents of which are hereby incorporated by reference.

TECHNICAL FIELD

The present disclosure relates to an apparatus for generating an electron radiation as well as a three-dimensional (3D) printing apparatus for producing a spatially extended product.

BACKGROUND

Apparatus for generating electron radiation, which can be used for 3D printing, are known. In particular, an electron beam in this context impinges on a starting material made of a metal bar stock material, as a result of which the starting material melts locally. In this way, the starting material can be deposited at specified locations in a working area in order to construct layer by layer an object that is to be produced.

The drawback with such a process is usually the fact that voltages of up to 100 kV have to be used to accelerate the electrons, so that, when the electrons impinge on the starting material, X-ray radiation with energy of up to 100 key are produced. It is possible to shield against this radiation only with considerable difficulty. Furthermore, the high power density of such electron radiation may lead to problems, because it may result in the partial evaporation of the metallic starting material. In addition, the magnets, which are generally used to deflect the electron radiation, allow only a slow scan speed of the electron beam in the working area.

The problem on which the present disclosure is based is to provide an apparatus that generates less harmful radiation and/or is more appropriate for a 3D printing method. Furthermore, an object is to provide a 3D printing apparatus having such an apparatus.

SUMMARY

The above object is achieved by an apparatus that comprises:
  an elongated, wire-shaped hot cathode, from which during the operation of the apparatus an electron radiation is emitted that has an elongated, line-shaped cross section due to the elongated shape of the hot cathode perpendicular to its direction of propagation, wherein the extension of the line-shaped cross section is significantly greater in the longitudinal direction of the line than in the transverse direction of the line,
  a cathode electrode,
  an anode electrode, which has an opening through which the electron radiation, emitted from the hot cathode, can pass, wherein during the operation of the apparatus a voltage is applied between the cathode electrode and the anode electrode in order to accelerate the electrons emitted from the hot cathode,
  a deflecting unit, which can deflect the electron radiation, which has passed through the opening of the anode electrode, wherein during the operation of the apparatus the cross section of the electron radiation is changed by the deflecting unit such that the extension in the longitudinal direction of the line is decreased, and the extension in the transverse direction of the line is increased such that the extensions in the longitudinal direction of the line and in the transverse direction of the line are about the same size, and preferably the electron radiation has a rotationally symmetrical cross section.

An elongated hot cathode can be used to generate an electron radiation having a line-shaped cross section. Furthermore, due to the use of an elongated hot cathode the current of the electron radiation, emitted from the hot cathode, can be significantly greater than in the case of a substantially point-shaped hot cathode. For example, currents of 1 A can be achieved. As a result, the acceleration voltage can be reduced to, for example, 10 kV to 15 kV. As a result, no high energy X-ray radiation is produced when the X-ray radiation impinges on a starting material for the 3D printing, so that there is no need for expensive shielding of the apparatus. Due to the beam transformation of the electron radiation in a working area to form a comparatively point-shaped or, more specifically, rotationally symmetrical radiation, the starting material can be totally melted in an effective way, nevertheless.

It can be provided that the deflecting unit comprises at least one deflecting electrode. In this case the at least one deflecting electrode can be designed and/or can be arranged in the apparatus such that the electron radiation, which has passed through the opening of the anode electrode, is reflected by the at least one deflecting electrode. Owing to a deflection with an electrode, as compared to the deflection with magnetic fields, significantly higher scan speeds of the electron radiation in the working area can be achieved. Given the geometry of the deflecting electrodes that is used as an example, it is possible to achieve deflection frequencies of up to 120 kHz, an aspect that is due to the very small capacitors of the deflecting electrodes.

It can be provided that the at least one deflecting electrode has a negative potential with respect to the anode electrode, and can be at the same potential as the cathode electrode, and connected to the same voltage source as the cathode electrode. Due to the connection to the same voltage source, it can be ensured that the electrons are decelerated to the greatest extent possible by the deflecting electrode before the electrons are accelerated in the direction of the working area.

There is the option that the deflecting unit, in particular, the at least one deflecting electrode, is designed such that the electron radiation, which has passed through the opening of the anode electrode, is divided into several partial radiations. In particular, the several partial radiations may be superimposed in a working area. Due to the division into several partial radiations and then the superimposing in the working area an electron radiation having a line-shaped cross section can be transformed in a comparatively effective manner into an electron radiation having a rotationally symmetrical cross section.

It can be provided that the deflecting unit comprises at least one further electrode, which has a positive potential with respect to the at least one deflecting electrode and can accelerate the electrons after the interaction with the at least one deflecting electrode, wherein the further electrode has an opening through which the electron radiation, emitted from the at least one deflecting electrode, can pass. In this way the decelerated electrodes can be accelerated in the direction of the additional electrode. Therefore, this additional electrode should be positioned such that the acceleration occurs at the desired angle of deflection.

There is the option that the deflecting unit comprises at least two mutually opposite deflecting electrodes arranged behind the further electrode in the direction of propagation of the electron radiation, wherein an AC voltage can be applied between the at least two mutually opposite deflecting electrodes in order to deflect the electron radiation. The deflecting electrodes can be used to form or, more specifically, to homogenize the beam profile of the electron radiation in the working area. In particular, the AC voltage can have a comparatively high frequency of, for example, up to 120 kHz, so that the electron radiation or its partial radiations can be moved back and forth at a high speed in the working area or, more specifically, on the starting material. In this case, the AC voltage can be influenced in a targeted manner in order to expose some areas of the surface of the starting material to the electron radiation longer than other areas.

It can be provided that the cathode electrode is divided into segments in the longitudinal direction of the wire, forming the hot cathode. This aspect makes the division into partial radiations easier. In addition, this aspect allows a modular construction of the apparatus, because the sequential arrangement of several segments of the cathode electrode and the use of a longer wire, serving as the hot cathode, make it possible to enlarge the source in the longitudinal direction of the line-shaped electron radiation.

It can be provided that the 3D printing apparatus comprises several apparatus that are intended for generating an electron radiation and that are arranged in the 3D printing apparatus such that during the operation of the 3D printing apparatus their electron radiation impinges on the starting material from different directions. For example, the apparatus may be arranged circularly around the starting material, so that the starting material can be exposed to electron radiation on all sides at the same time. The result is an effective and very uniform complete melting of the starting material.

BRIEF DESCRIPTION OF THE DRAWINGS

Other features and advantages of the disclosed apparatus will become apparent from the following description of example implementations with reference to the accompanying drawings, which show in.

DETAILED DESCRIPTION

The same or functionally identical parts or elements are provided with the same reference numerals in the figures. Some of the figures show a Cartesian coordinate system.

In the apparatus described, some of the parts or, in particular, all of the parts can be disposed in a vacuum. The housing, required for this purpose, is not shown in the figures.

Figure 1:
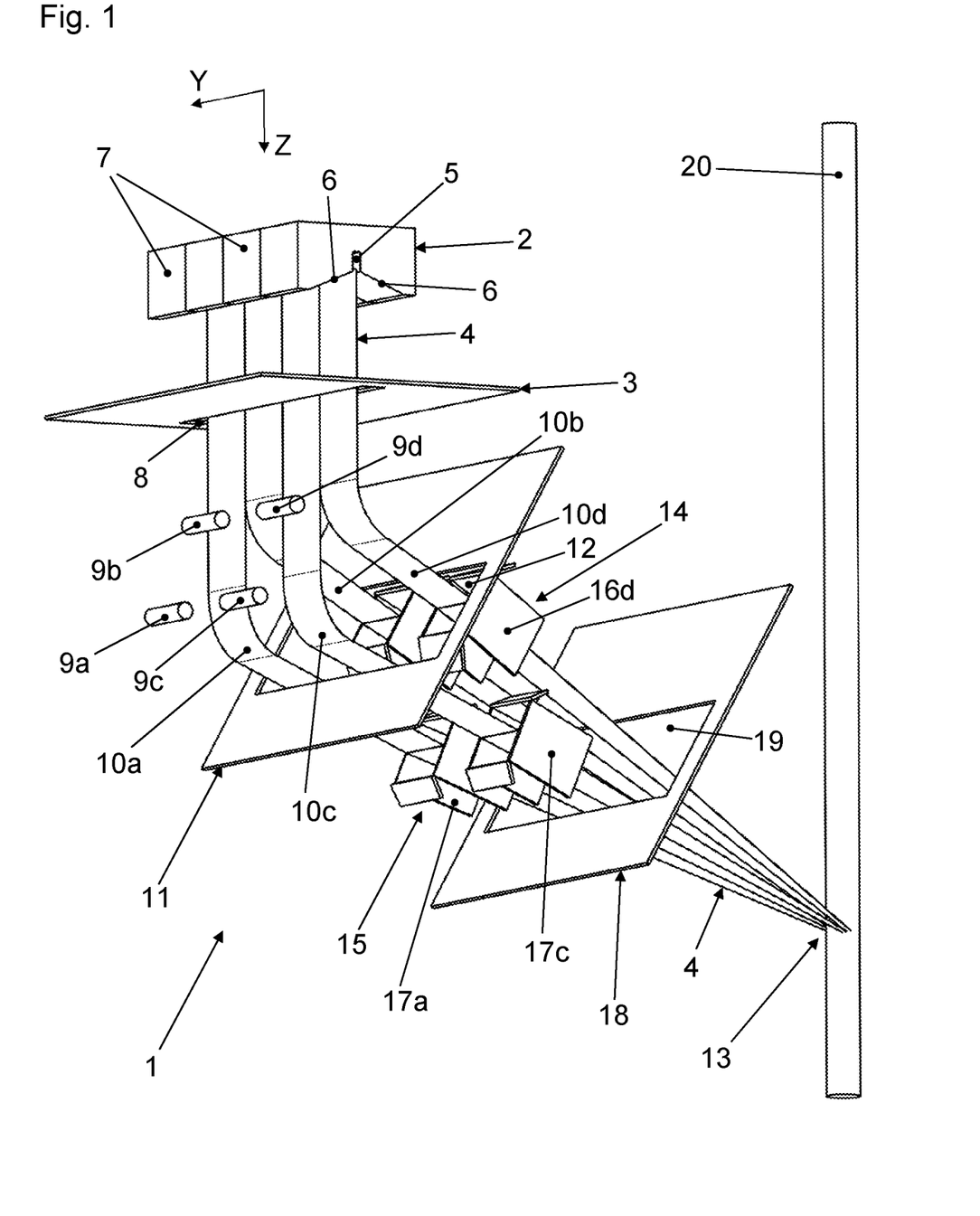
FIG. 1 is a perspective view of an example implementation of an inventive 3D printing apparatus with an example implementation of an inventive apparatus for generating an electron radiation, with the electron radiation, generated by the apparatus, shown as a sketch.
Figure 2:
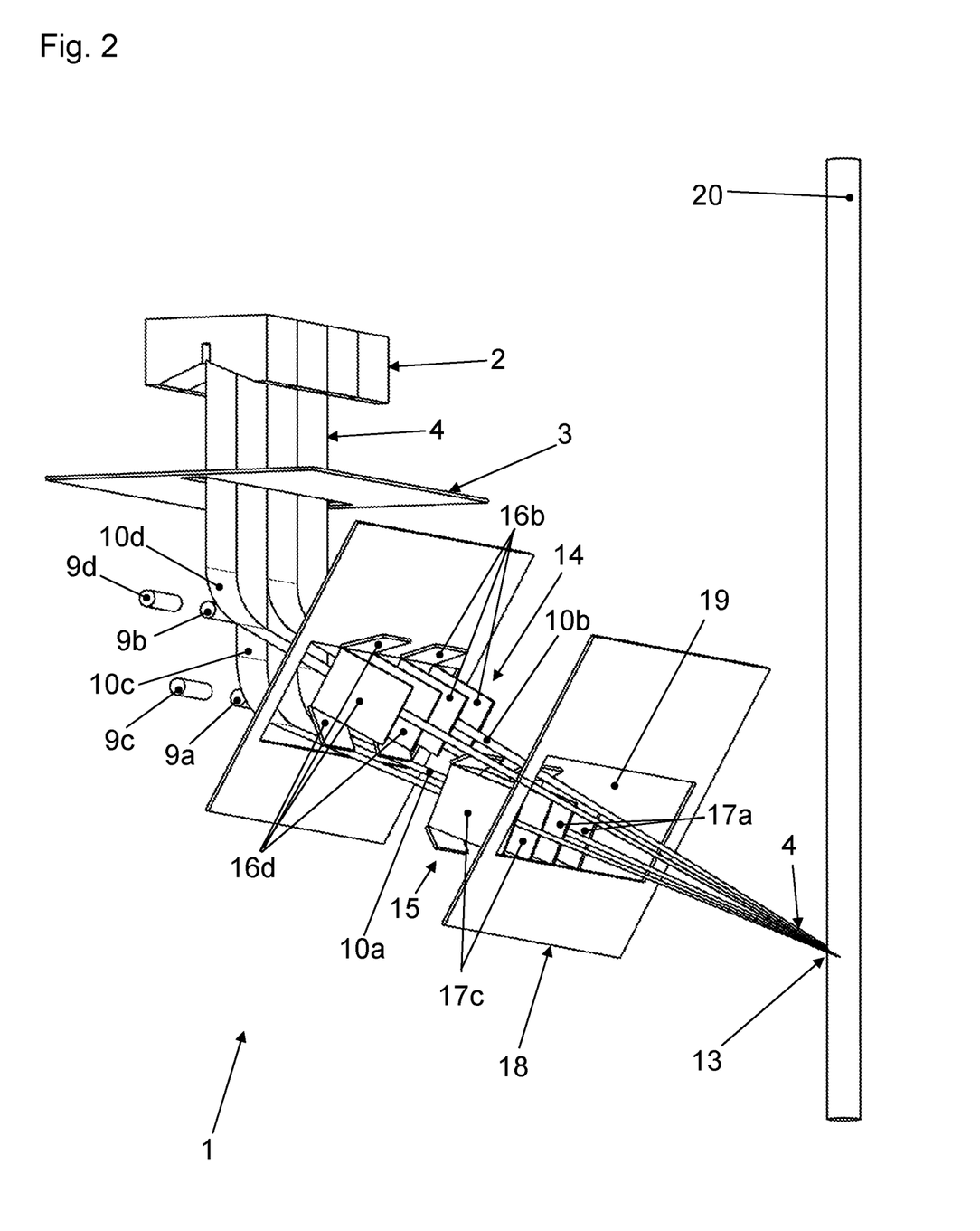
FIG. 2 is an additional perspective view of the 3D printing apparatus according to FIG. 1.

An example implementation of an inventive apparatus 1 that is shown in FIG. 1 and FIG. 2 and that is intended for generating an electron radiation comprises a hot cathode 5, a cathode electrode 2 and an anode electrode 3. With respect to these parts the apparatus 1 corresponds in essence to a Pierce type electron gun. It can generate an electron radiation 4 that propagates in the Z direction of the illustrated coordinate system from the hot cathode or, more specifically, from the cathode electrode 2 in the direction of the anode electrode 3.

The hot cathode 5 is constructed as a wire and disposed in a cavity in the cathode electrode 2. The hot cathode 5 extends in a longitudinal direction that corresponds to the Y direction of the illustrated coordinate system. Correspondingly the longitudinal direction is arranged perpendicular to the direction of propagation of the electron radiation 4. This design can be used to achieve a line-shaped cross section of the electron beam 4, wherein the longitudinal direction of the line-shaped cross section is aligned parallel to the longitudinal direction of the wire, forming the hot cathode 5. The wire may have, for example, a diameter of 1 mm and a length between 100 mm and 160 mm in the Y direction.

A voltage from a voltage source, which is not shown, is applied to the hot cathode 5 such that a current flows through the hot cathode that causes the hot cathode to heat up. In this case the hot cathode 5 may be at least partially at the same potential as the cathode electrode 2.

The cathode electrode 2 may have, for example, a length between 80 mm and 120 mm in the Y direction. The cathode electrode 2 comprises sections 6 that extend away from the hot cathode and enclose with one another an angle between 110° and 150°, for example, an angle of about 135°. In the illustrated example implementation, the two sections 6 are segmented, for example, divided into four segments 7.

It is certainly possible not to provide any segmentation or to provide a segmentation into more or fewer segments.

The anode electrode 3 has an opening 8, through which the electron radiation 4, emitted from the hot cathode 5, can pass. The opening 8 is rectangular and may have a much larger dimension in its longitudinal direction, which extends in the Y direction in FIG. 1, than in its transverse direction, in order to allow the electron radiation 4 with a line-shaped cross section to pass through.

During the operation of the apparatus 1, a voltage is applied between the cathode electrode 2 and the anode electrode 3, in order to accelerate the electrons, emitted from the hot cathode. The voltage may be, for example, between 10 kV and 15 kV. In this case, the cathode electrode 2 is connected to the negative pole, and the anode electrode 3 is connected to the positive pole of a voltage source that is not shown, wherein the anode electrode 3 can be additionally connected to ground.

Furthermore, the apparatus 1 comprises a plurality of deflecting electrodes 9a, 9b, 9c, 9d that serve as a deflecting unit and that are arranged in the beam path of the electron radiation 4 downstream of the anode electrode 3. In the example implementation shown, four deflecting electrodes 9a, 9b, 9c, 9d are provided. However, it is also quite possible to provide more or fewer deflecting electrodes 9a, 9b, 9c, 9d.

In the illustrated example implementation, the individual deflecting electrodes 9a, 9b, 9c, 9d are designed so as to be rod shaped and have a cylindrical cross section. It is certainly possible that the deflecting electrodes 9a, 9b, 9c, 9d have another shape.

The deflecting electrodes 9a, 9b, 9c, 9d are also at a negative potential or several different negative potentials. In particular, it may be provided that one, several or all of the deflecting electrodes 9a, 9b, 9c, 9d are at the same negative potential as the cathode electrode 2. Preferably, one, several or all of the deflecting electrodes 9a, 9b, 9c, 9d are connected to the negative pole of the same voltage source as the cathode electrode 2. In this way, it can be achieved that the electrons of the electron radiation 4 come in essence to a stop at the deflecting electrode 9a, 9b, 9c, 9d.

The electrode radiation 4 is deflected by the deflecting electrodes 9a, 9b, 9c, 9d, for example, by about 50° to 60°. It is certainly possible to provide a deflection by other angles.

The deflecting electrodes 9a, 9b, 9c, 9d are spatially offset from one another in the direction of propagation of the electron radiation 4, emitted from the anode electrode 3, or, more specifically, in the Z direction. Due to this spatial offset of the individual deflecting electrodes 9a, 9b, 9c, 9d from one another, portions of the electrode radiation 4 are deflected closer to the anode electrode 3 than other parts of the electrode radiation 4. In this way, the electron radiation 4 is split into a plurality of partial radiations 10a, 10b, 10c, 10d during the deflection.

It can be seen in FIG. 1 that from left to right or, more specifically, in the negative Y direction, the first deflecting electrode 9a and the third deflecting electrode 9c are arranged further downwards than the second deflecting electrode 9b and the fourth deflecting electrode 9d. Therefore, the electron radiation 4, impinging on the second and the fourth deflecting electrode 9b, 9d respectively, is deflected earlier to the right in FIG. 1 than the electron radiation 4, impinging on the first and the third deflecting electrode 9a, 9c respectively. The result is that in FIG. 1 the partial radiations 10b, 10d of the electron radiation 4, where the partial radiations are deflected by the second deflecting electrode 9b and the fourth deflecting electrode 9d respectively, run above or, more specifically, in the negative Z direction at a distance from the partial radiations 10a, 10c, which are deflected by the first deflecting electrode 9a and the third deflecting electrode 9c.

Furthermore, the apparatus 1 comprises a further electrode 11 in the direction of propagation of the electron radiation 4 or, more specifically, of the partial radiations 10a, 10b, 10c, 10d downstream of the deflecting electrodes 9a, 9b, 9c, 9d. The further electrode 11 has an opening 12 for the passage of the electron radiation 4 or, more specifically, the partial radiations 10a, 10b, 10c, 10d. The opening 12 is also designed so as to be rectangular and may have a much larger dimension in its longitudinal direction than in its transverse direction. The further electrode 10 is connected, for example, to ground and has, therefore, a positive potential with respect to the deflecting electrodes 9a, 9b, 9c, 9d. Therefore, the electrons of the electron radiation 4 or, more specifically, of the partial radiations 10a, 10b, 10c, 10d, the electrons of which are decelerated at the deflecting electrode, are accelerated by the deflecting electrodes 9a, 9b, 9c, 9d in the direction of the further electrode 11 and pass through the opening 12.

Because the maximum of the positive potential of the electrode 11 is arranged essentially in the center of the opening 12, the partial radiations 10a, 10b, 10c, 10d are deflected approximately in the direction of the center of the opening 12 of the electrode 11, so that they come closer to one another in the further course of the beam path. Ultimately the result is that the partial radiations 10a, 10b, 10c, 10d are superimposed in a working area 13, in which then the reunited electron radiation 4 has preferably an approximately rotationally symmetrical cross section.

For example, a bar-shaped starting material 20 that is made of metal for the 3D printing can be disposed in the working area 13, and the metal starting material can be totally melted by the reunited electron radiation 4.

In the example implementation according to FIG. 1 and FIG. 2, two groups 14, 15 of additional multi-part deflecting electrodes 16b, 16d; 17a, 17c are arranged downstream of the electrode 11 and, in addition, a further electrode 18 with an opening 19 is also provided downstream of the additional multi-part deflecting electrodes. In this case, the partial radiations 10b, 10d pass through between the individual parts of the deflecting electrodes 16b, 16d, whereas the partial radiations 10a, 10c pass through between the individual parts of the deflecting electrodes 17a, 17c. As a result, the deflecting electrodes 16b, 16d of the first group 14 act on the partial radiations 10b, 10d, whereas the deflecting electrodes 17a, 17c of the second group 15 act on the partial radiations 10a, 10c.

In the example implementation according to FIG. 1 and FIG. 2, the individual parts of the deflecting electrodes 16b, 16d; 17a, 17c are formed by two or four mutually opposite plates, between which the associated partial radiation 10a, 10b, 10c, 10d passes through.

A voltage, in particular an AC voltage, can be applied between the individual parts of the deflecting electrodes 16b, 16d; 17a, 17c, each associated with one of the partial radiations 10a, 10b, 10c, 10d. The corresponding voltage source is not depicted. The AC voltage may have, for example, a frequency of 10 kHz and greater than 10 kHz, for example, a frequency of up to 120 kHz.

The deflecting electrodes 16b, 16d; 17a, 17c are used to form or, more specifically, to homogenize the beam profile of the electron radiation 4 in the working area 13. In particular, due to the comparatively high frequency of the AC voltage the deflecting electrodes 16b, 16d; 17a, 17c can move the partial radiations 10a, 10b, 10c, 10d back and forth at a high speed in the working area 13 or, more specifically, on the starting material 20.

In this case it is possible to influence, in particular, the AC voltage in a targeted way, in order to expose some areas of the surface of the starting material 20 to the electron radiation 4 longer than other areas.

Figure 3:
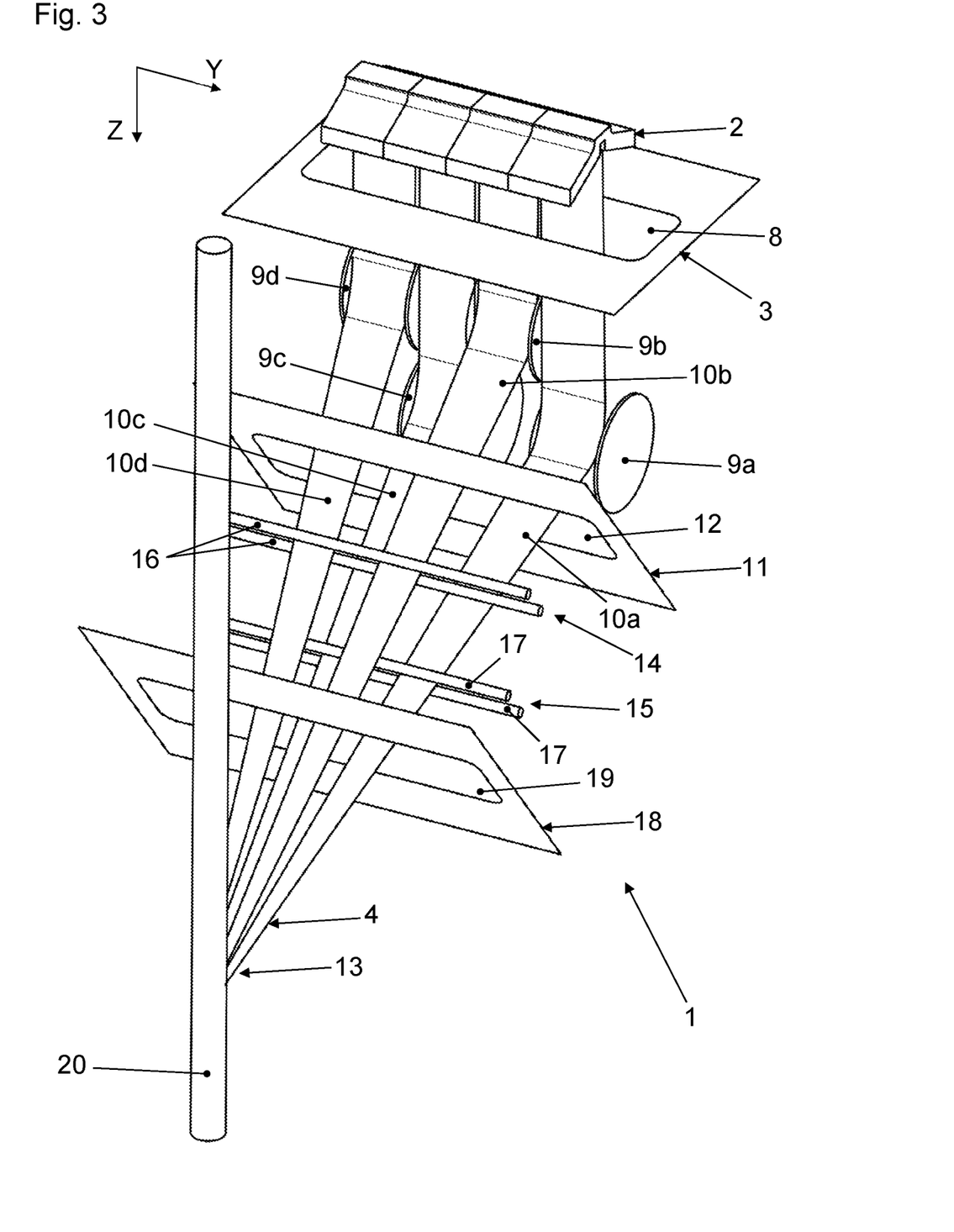
FIG. 3 is a perspective view of another implementation of an inventive 3D printing apparatus with another implementation of an inventive apparatus for generating an electron radiation, with the electron radiation, generated by the apparatus, shown as a sketch.
Figure 4:
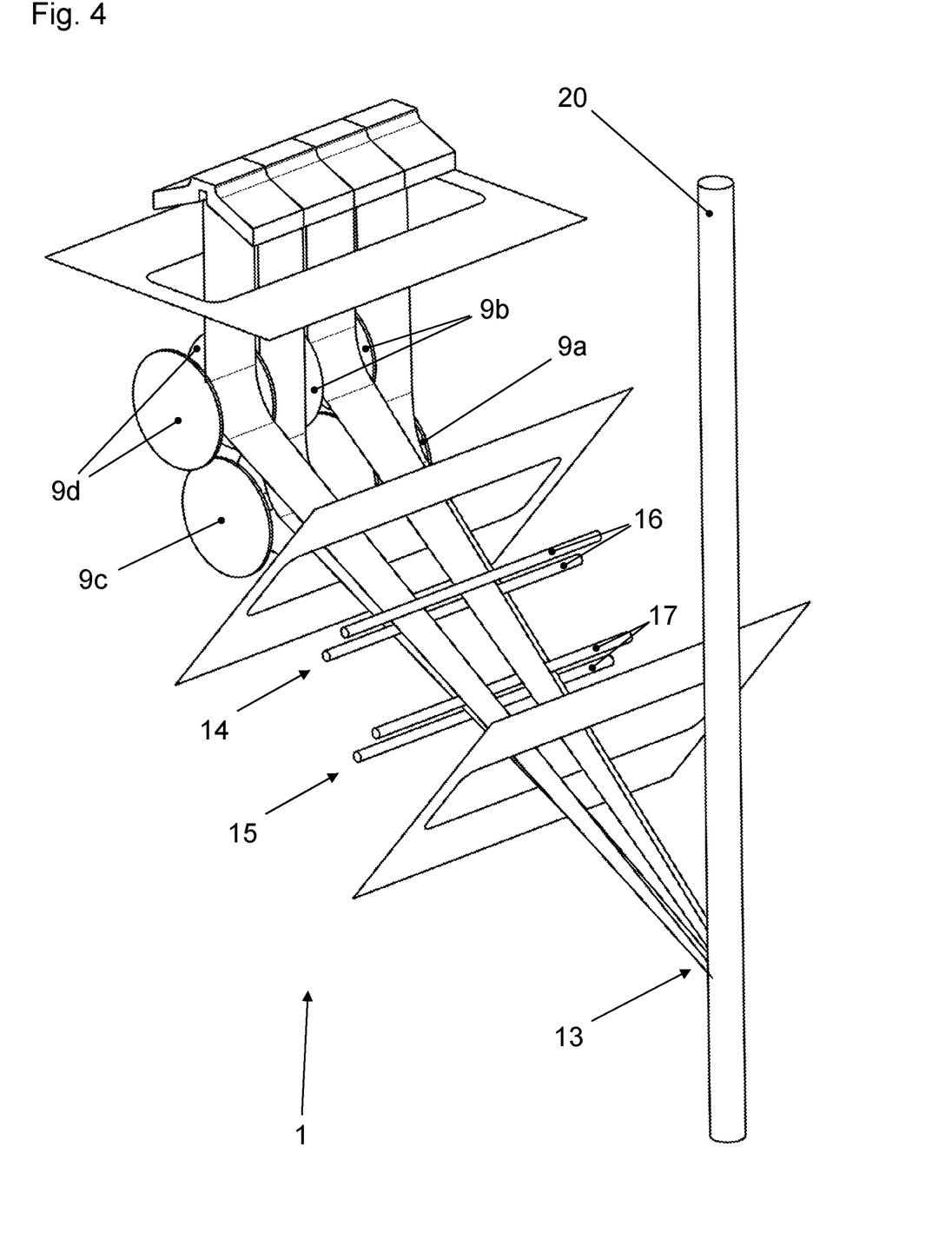
FIG. 4 is an additional perspective view of the 3D printing apparatus according to FIG. 3.
Figure 5:
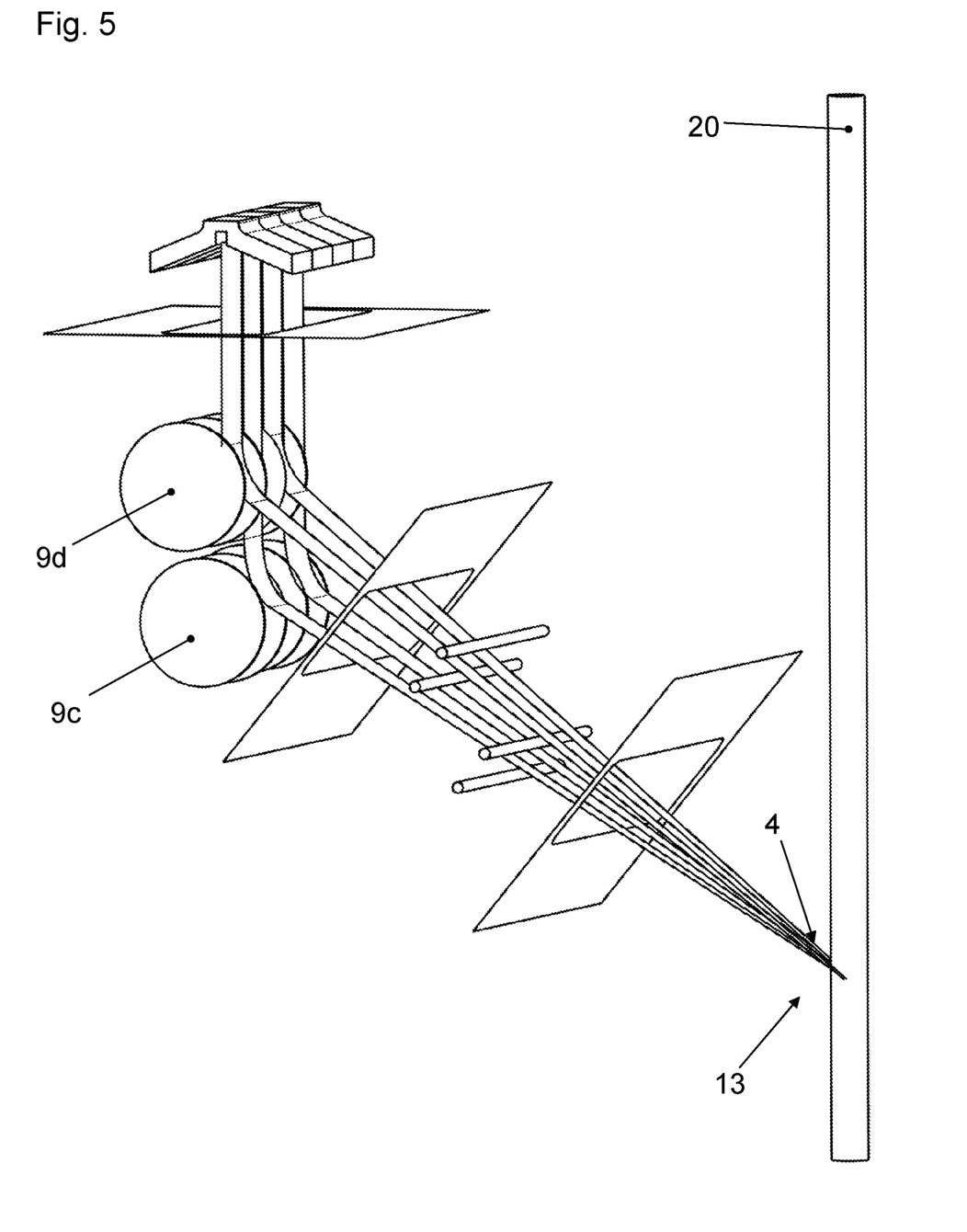
FIG. 5 is another perspective view of the 3D printing apparatus according to FIG. 3.

Another example implementation, shown in FIG. 3 to FIG. 5, differs from the implementation in FIGS. 1 and 2 by the fact that, on the one hand, the openings 12 and 19 of the electrodes 11, 18 correspond with respect to their shape and size essentially to the opening 8 in the anode electrode 3.

On the other hand, the cathode 2 of this second example is shaped differently than the cathode 2 of the first example.

Furthermore, the deflecting electrodes 9a, 9b, 9c, 9d of the second example implementation are shaped differently than the deflecting electrodes 9a, 9b, 9c, 9d of the first example implementation.

Furthermore, separate deflecting electrodes 16b, 16d; 17a, 17c are not provided for each of the partial radiations 10a, 10b, 10c, 10d. Instead, each of the groups 14, 15 has exactly two deflecting electrodes 16, 17, between which two each of the partial radiations 10a, 10b, 10c, 10d pass through.

In particular, the partial radiations 10b, 10d pass through between the two deflecting electrodes 16 of the first group 14, whereas the partial radiations 10a, 10c pass through between the two deflecting electrodes 17 of the second group 15. As a result, the deflecting electrodes 16 of the first group 14 act on the partial radiations 10b, 10d, whereas the deflecting electrodes 17 of the second group 15 act on the partial radiations 10a, 10c.

Figure 6:
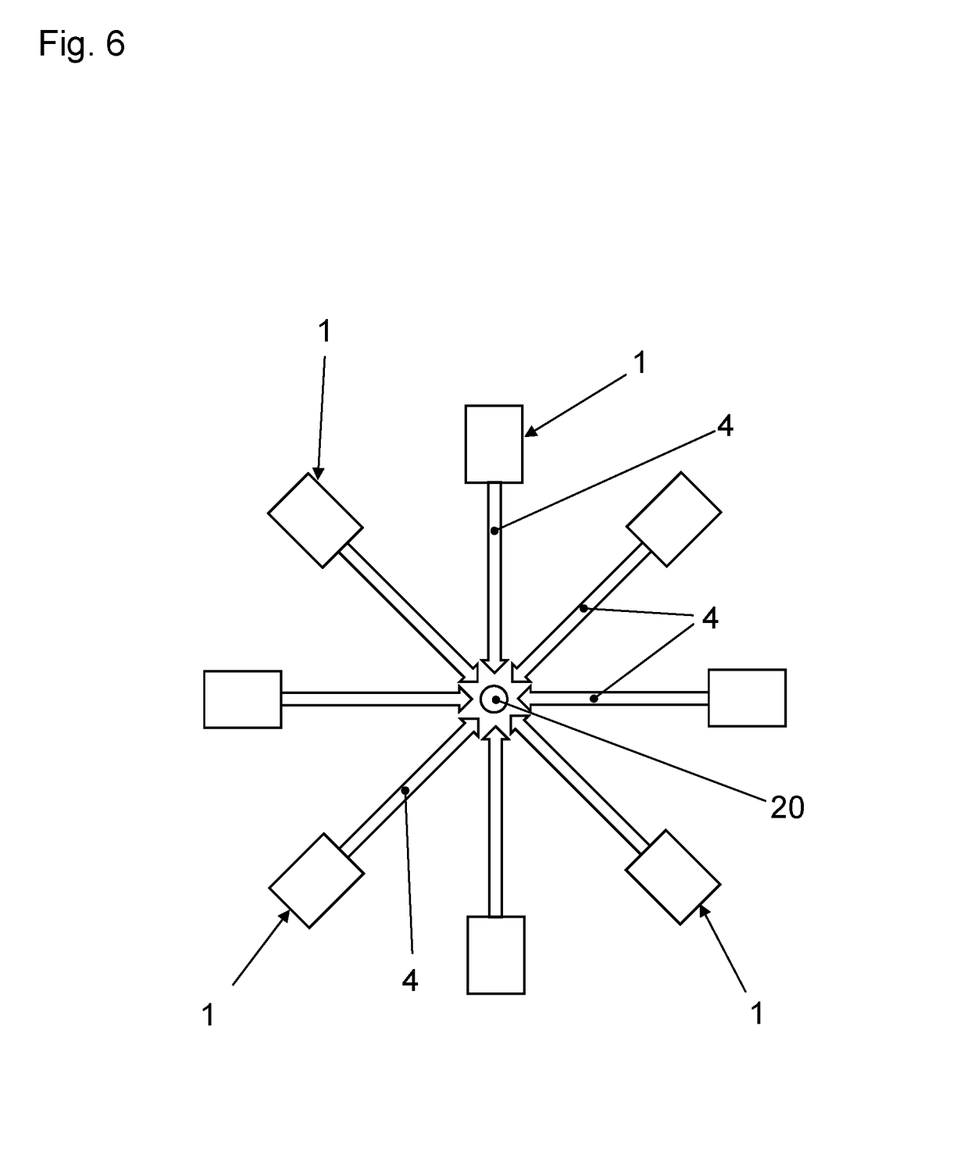
FIG. 6 is in schematic form a plan view of another implementation of an inventive 3D printing apparatus with several inventive apparatuses for generating an electron radiation, with the electron radiations, generated by the apparatuses, shown as a sketch.

FIG. 6 shows a sketch of an example implementation of a 3D printing apparatus that comprises several apparatus 1 for generating an electron radiation 4. In this case the apparatus 1 are arranged on a circle about the bar-shaped starting material 20, so that during the operation of the 3D printing apparatus the electron radiations 4 of the apparatus 1 impinge on the starting material 20 from different directions.

What is claimed is:

1. An apparatus for generating electron radiation, the apparatus comprising:
   an elongated, wire-shaped hot cathode to emit electron radiation having an elongated, line-shaped cross section perpendicular to a direction of propagation of the electron radiation due to an elongated shape of the hot cathode, where an extent of the hot cathode is significantly greater in a longitudinal direction than in a transverse direction;
   a cathode electrode;
   an anode electrode with an opening through which the electron radiation emitted from the hot cathode can pass, wherein a voltage applied between the cathode electrode and the anode electrode accelerates electrons emitted from the hot cathode; and
   a deflecting unit to deflect the electron radiation downstream of the opening of the anode electrode, wherein a cross section of the electron radiation perpendicular to the direction of propagation is changed by the deflecting unit to decease a longitudinal extent of the electron radiation and to increase a transverse extent of the electron radiation, wherein the at least one deflecting electrode is configured to divide the electron radiation into several partial radiations downstream of the opening of the anode electrode.

2. The apparatus of claim 1, wherein the electron radiation has a rotationally symmetrical cross section.

3. The apparatus of claim 1, wherein the deflecting unit comprises at least one deflecting electrode.

4. The apparatus of claim 3, wherein the at least one deflecting electrode is configured to reflect the electron radiation downstream of the opening the anode electrode.

5. The apparatus of claim 3, wherein the at least one deflecting electrode has a negative potential with respect to the anode electrode.

6. The apparatus of claim 5, wherein the at least one deflecting electrode is at the same potential as the cathode electrode.

7. The apparatus of claim 3, wherein the deflecting unit further comprises:
   at least one further electrode having a positive potential with respect to the at least one deflecting electrode to accelerate the electrons downstream of the at least one deflecting electrode, wherein the further electrode has an opening through which the electron radiation can pass.

8. The apparatus of claim 7, wherein the deflecting unit further comprises:
   at least two mutually opposite deflecting electrodes arranged downstream of the further electrode in the direction of propagation of the electron radiation, wherein an AC voltage applied between the at least two mutually opposite deflecting electrodes deflects the electron radiation.

9. The apparatus of claim 8, wherein the deflecting unit further comprises:
   at least another electrode arranged downstream of the at least two mutually opposite deflecting electrodes in the direction of propagation of the electron radiation, wherein the another electrode has an opening through which the electron radiation can pass.

10. The apparatus of claim 1, wherein the deflecting unit is configured to superimpose the several partial radiations in a working area.

11. The apparatus of claim 1, wherein the combination of the hot cathode, the cathode electrode, and the anode electrode corresponds to a Pierce electron gun.

12. The apparatus of claim 1, wherein the cathode electrode is divided into segments in the longitudinal direction of the hot cathode.

13. A three-dimensional (3D) printing apparatus for producing a spatially extended product, the 3D printing apparatus comprising:
   the apparatus for generating electron radiation according to claim 1;
   a working area to receive a starting material to be exposed to electron radiation for 3D printing, wherein the working area is arranged in the 3D printing apparatus such that the electron radiation impinges on the starting material.

14. The 3D printing apparatus of claim 13, further comprising the starting material, wherein the starting material is bar shaped and comprises metal.

15. The 3D printing apparatus of claim 13, further comprising a plurality of the apparatus for generating electron radiation, the plurality of apparatus for generating electron radiation being arranged in the 3D printing apparatus such that electron radiation from the plurality of apparatus impinges on the starting material from different directions.

16. The apparatus of claim 1, wherein the longitudinal and transverse extents of the electron radiation perpendicular to the direction of propagation are about the same size.

* * * * *